STOCKSTILL & DILLE.
Meat Cutter.
No. 79,085. Patented June 23, 1868.
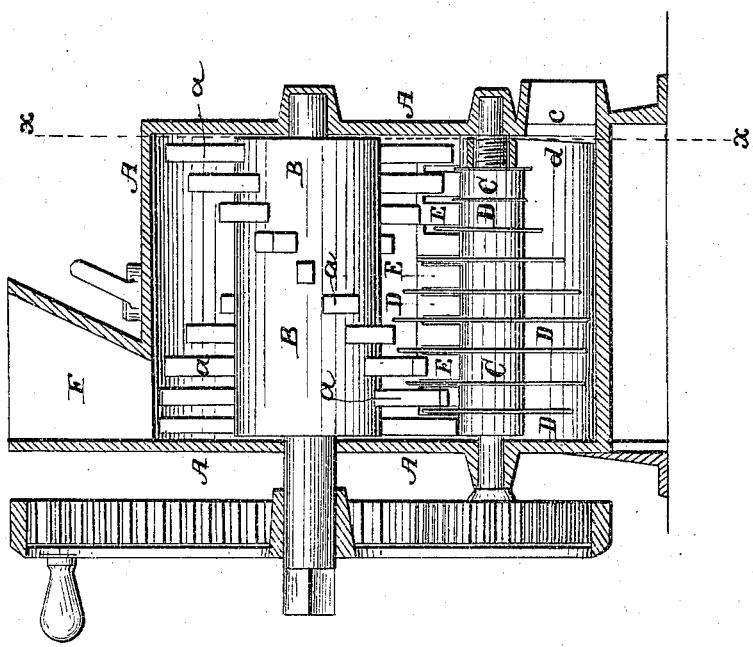
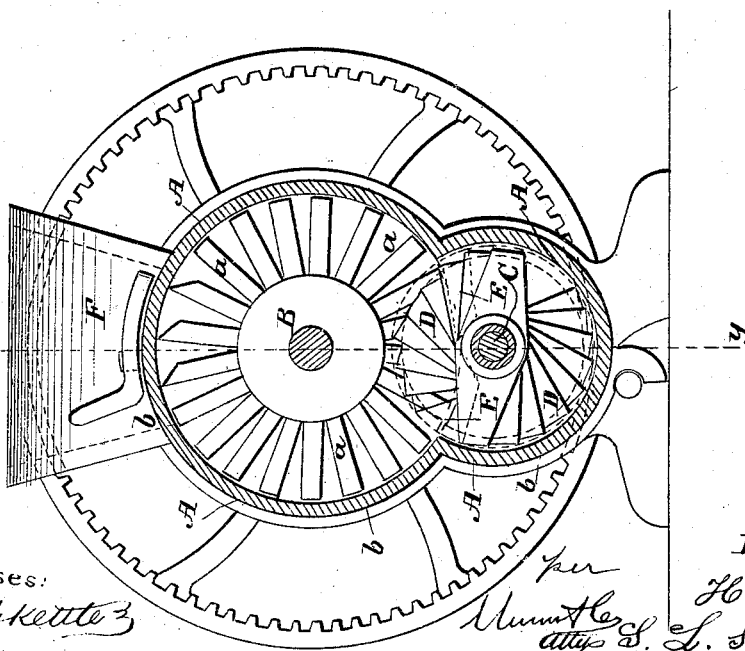

United States Patent Office.

S. L. STOCKSTILL AND H. H. DILLE, OF MEDWAY, OHIO.

Letters Patent No. 79,085, dated June 23, 1868.

IMPROVED MEAT-CUTTER.

*The Schedule referred to in these Letters Patent and making part of the same.*

TO ALL WHOM IT MAY CONCERN:

Be it known that we, S. L. STOCKSTILL and H. H. DILLE, of Medway, in the county of Clark, and State of Ohio, have invented a new and improved Meat-Cutter; and we do hereby declare that the following is a full, clear, and exact description thereof, which will enable others skilled in the art to make and use the same, reference being had to the accompanying drawings, forming part of this specification.

Figure 1 represents a vertical transverse section of our improved meat-cutter, taken on the plane of the line $x\,x$, fig. 2.

Figure 2 is a vertical longitudinal section of the same, taken on the plane of the line $y\,y$, fig. 1.

Similar letters of reference indicate corresponding parts.

This invention relates to a new machine for cutting meat for the production of sausages, hash, or other articles of food, and consists chiefly of two rollers, of which one carries a set of cutters that work between arms projecting from the other, and through a stationary slotted plate. The cutters and the arms are set spirally around their respective rollers, so as to feed the cut meat toward one end of the machine, where it is discharged.

A, in the drawing, represents a case or shell, of suitable size, and made of suitable material. In its ends are the bearings for two shafts or rollers, B and C, of which the upper one, B, carries a series of projecting spikes or arms, $a\,a$, while on the lower roller, C, is secured a series of projecting knives or cutters, D D, as shown. The knives, as well as the spikes, are set spirally around their respective shafts, as shown. The spikes are set so far apart that the knives fit between them.

From the case A projects, between the shafts B C, a slotted plate, E, which is below and out of reach of the spikes, but close above the roller C. The cutters fit and work through the slots arranged in this plate.

The frame A is or should be composed of two parts, of which one is stationary, while the other, $b$, can be swung down, to allow the removal of the rollers. The plate E, consequently, consists of two sections, one being attached to each part of the frame. The inner face of the frame A is so shaped that the spikes and cutters can just turn in it, as indicated in fig. 1.

The knives are made narrower at their outer ends, as shown, so as to produce a drawing cut. The shafts B C may be geared together, as shown, or are otherwise connected, and receive rotary motion from suitable mechanism.

Through a hopper, F, the meat to be cut is inserted into the machine, and is, by the spikes, carried around, and held to the cutters, which work between the spikes, and if pieces of meat are not retained by the spikes, they fall upon the plate E, and are thereon cut up into such small particles that they can fall through the slots in the plate E to the lower compartment of the case, whence they will be discharged through a hole, $c$, in one end of the case, to which they are carried by the spirally-set knives. The size of the discharge-hole can be regulated by a damper or plate, $d$, so as to have the meat carried off with a certain desired speed.

We claim as new, and desire to secure by Letters Patent—

1. The inclined slotted plate E, attached to opposite sides of the shell A, below the spikes $a$, whereby, as the two halves of the shell are brought together, the inner edges of the plates fit against each other, to form a partition, as herein described, for the purpose specified.

2. A meat-cutter, consisting of two rollers, B and C, carrying spikes and cutters respectively, and working within a case, A, that is, by means of a slotted partition, E, divided into two compartments, as set forth.

The above specification of our invention signed by us, this 15th day of February, 1868.

S. L. STOCKSTILL,
H. H. DILLE.

Witnesses:
ALEXANDER DILLE,
ELIAS ALSPAUGH.